United States Patent [19]

Nagase et al.

[11] 3,876,515

[45] Apr. 8, 1975

[54] METHOD FOR MANUFACTURE OF PERFLUOROCYCLOHEXANE DERIVATIVES

[75] Inventors: Shunji Nagase; Hajime Baba; Kazuo Kodaira; Takashi Abe; Michimasa Yonekura, all of Nagoya, Japan

[73] Assignee: Agency of Industrial Science & Technology, Tokyo, Japan

[22] Filed: Dec. 10, 1973

[21] Appl. No.: 424,345

[30] Foreign Application Priority Data
Dec. 27, 1972 Japan.................................. 47-2874

[52] U.S. Cl............................................... 204/59 F
[51] Int. Cl.. C07b 28/66; C07c 17/22; C07c 23/10
[58] Field of Search................................... 204/59 F

[56] References Cited
UNITED STATES PATENTS
3,616,336  10/1971  Childs et al......................... 204/130

*Primary Examiner*—F. C. Edmundson
*Attorney, Agent, or Firm*—Kurt Kelman

[57] ABSTRACT

Aromatic hydrocarbons such as, for example, trifluoromethyl benzonitrile and bis-(trifluoromethyl)-benzonitrile which are composed of benzene derivatives having nitrile and trihalogenated methyl substituted for hydrogens of benzene are dissolved in anhydrous hydrogen fluoride and the solutions are electrolyzed to produce perfluoro-alicyclic hydrocarbons composed of perfluorocyclohexane derivatives having trifluoromethyl substituted for fluorine of perfluorocyclohexane.

2 Claims, No Drawings

METHOD FOR MANUFACTURE OF PERFLUOROCYCLOHEXANE DERIVATIVES

BACKGROUND OF THE INVENTION

This invention relates to a novel method for the manufacture of perfluoro-alicyclic hydrocarbons which are composed of perfluorocyclohexane derivatives having trifluoromethyl substituted for fluorine of perfluorocyclohexane.

Perfluoro-alicyclic hydrocarbons resulting from substitution of fluorine for every hydrogen atom of corresponding alicyclic hydrocarbons are chemically inactive, nonflammable and scarcely toxic and, therefore, have come to find extensive use as coolants, insulating agents, solvents, diluents, heat mediums, etc.

In producing perfluoro-alicyclic hydrocarbons, there has been suggested a method whereby alicyclic hydrocarbons or aromatic hydrocarbon having the same numbers of carbon atoms forming their rings are caused to react with fluorine gas or metal fluorides of high valency such as cobalt trifluoride and silver difluoride.

German Pat. No. 1,119,262 discloses a method which comprises subjecting partially fluorinated alicyclic hydrocarbons to further fluorination by means of electrolysis.

These known methods are not free from disadvantages. Fluorine gas is difficult of handling and expensive as industrial chemicals go. High-valency metal fluorides such as cobalt trifluoride and silver difluoride require fluorine gas in their synthesis. In the case of the method of German Pat. No. 1,119,262, since partially fluorinated compounds used as the starting material are synthesized by a complicated process, finished products are so expensive as to make commercial application of the invention difficult.

Generally when an aromatic hydrocarbon is fluorinated by electrolysis, a tarry substance occurs in the electrolytic bath and it adheres to the surface of electrodes to impede smooth flow of electric current therebetween.

A primary object of this invention is to provide a method for the manufacture, with extreme ease, of perfluoroalicyclic hydrocarbons composed of perfluorocyclohexane derivatives having trifluoromethyl groups substituted for a part or all fluorine atoms of perfluorocyclohexane and represented by the generic formula:

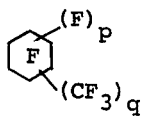

(wherein, $q$ is one member selected from the group consisting of integers of 2 through 6 and $p$ is a numeral equaling the subtraction "12 - q") to be produced in good yields by subjecting aromatic hydrocarbons as the raw material to electrolysis.

Another object of this invention is to provide a method for fluorinating aromatic hydrocarbons by electrolysis, which method precludes formation of tarry substance and, therefore, permits smooth flow of electric current between the electrodes.

SUMMARY OF THE INVENTION

A benzene derivative which has nitrile group and tri- halogenated methyl group substituted for hydrogen atoms of benzene is soluble in anhydrous hydrogen fluoride. When the solution of the benzene derivative in anhydrous hydrogen fluoride is subjected to electrolysis, the reaction of electrolytic fluorination proceeds smoothly in the solution. During the reaction, the carbon-nitrogen bond is opened to induce addition of fluorine atoms to the carbon atom. On the other hand, the carbon-carbon bond between the benzene ring and the nitrile group remains intact. Consequently, there are formed as many trifluoromethyl groups as nitrile groups originally present in the molecule.

Further, all the hydrogen atoms which remain unsubstituted with nitrile or trihalogenated methyl are invariably subjected to substitution with fluorine to give rise to a cyclohexane derivative substituted with trifluoromethyl groups. At the end of the electrolysis, the reaction system contains the product desired in conjunction with various fluorocarbons. From this mixture, the product INVENTION isolated by any of known techniques such as distillation and gas chromatography, for example.

DETAILED DESCRIPTION OF THE INVENTION:

The inventors pursued a study to develop a method for fluorinating aromatic hydrocarbons efficiently by electrolysis and thereby producing perfluoro-alicyclic hydrocarbons having trifluoromethyl substituted for fluorine. Consequently, they have made a discovery that highly desirable results are obtained when aromatic hydrocarbons having nitrile group and trifluoro group substituted for hydrogen atoms are subjected to fluorination by electrolysis. This invention has been accomplished on the basis of this discovery. Aromatic hydrocarbons of the type mentioned above are thoroughly soluble in anhydrous hydrogen fluoride. When the solutions of the aromatic hydrocarbons in anhydrous hydrogen fluoride are subjected to electrolysis, the aromatic hydrocarbons in the solutions undergo fluorination smoothly. During this fluorination, the carbon-nitrogen bond of the nitrile group is opened but the carbon-carbon bond between the benzene ring and the nitrile group remains intact. The nitrogen atom of each nitrile group present severed from the carbon as mentioned above undergoes fluorination, with the result that as many trifluoromethyl groups are newly formed as nitrile groups originally present.

In the case of an aromatic hydrocarbon which has trifluoro groups from the beginning, therefore, the perfluoro-alicyclic hydrocarbon produced therefrom by the fluorination according to the present method will have its trifluoro groups increased by a number equalling to that of nitrile groups which have undergone said fluorination.

Where a given aromatic hydrocarbon is of a type involving a ring substitution with a trihalogenated methyl in which the halogen is other than fluorine, the electrolytic fluorination will cause substitution of fluorine for a part or all of the halogen atoms present in said group. Depending on the kind of the aromatic hydrocarbon used as the raw material and the conditions for electrolysis, the electrolytic fluorination gives rise to a perfluorocyclohexane derivative having trifluoromethyl groups substituted for fluorine atoms in perfluorocyclohexane or a perfluoro-alicyclic hydrocarbon such as, for example, bis-(trifluoromethyl)-decafluorocyclohexane.

The aromatic hydrocarbons which are usable as raw materials for the present invention are composed of benzene derivatives represented by the generic formula:

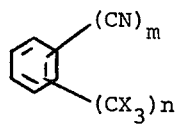

(wherein, $m$ is one member selected from the group consisting of integers of 1 through 5, $n$ is one member selected from the group consisting of integers of 1 through 5, the sum of $m + n$ is one member selected from the group consisting of integers of 2 through 6 and X is a halogen atom). Examples are trifluoromethy trifluoromethyl and bis-*trifluoromethyl)-benzonitrile.

Now, a description will be made of the method of electrolysis.

A compound satisfying the requirements as raw material is thoroughly soluble in anhydrous hydrogen fluoride. The solution having this compound dissolved in anhydrous hydrogen fluoride is subjected to electrolysis, using nickel anode and cathode. The temperature of the electrolytic bath is suitably selected from the range of from $-10°C$ to $+20°C$. The voltage of the potential is generally selected from the range of from 4 to 9 V and the current density from the range of from 0.5 to 3.0 $A/dm^2$. A fluoride of alkali metal may be added to the electrolytic bath to serve as an electroconductive agent. The suitable amount of the fluoride for this addition is about 10g per liter of anhydrous hydrogen fluoride. An inert gas such as helium or nitrogen may be bubbled through the electrolytic bath to effect agitation of the bath and, at the same time, facilitate vaporization of the product from the bath. The electrolysis conducted under the conditions mentioned above gives rise to a perfluoro-alicyclic hydrocarbon which is composed of a perfluorocyclohexane having trifluoromethyl groups substituted for fluorine atoms of perfluorocyclohexane, in conjunction with various forms of fluorocarbons and a trace of oxygen difluoride. Low boiling products are volatilized from the electrolytic bath and collected by a trap cooled with ice or liquefied nitrogen. Oxygen difluoride can be removed by washing with aqueous solution of sodium sulfite containing a small amount of potassium iodide. From the product collected in the trap, the perfluoro-alicyclic hydrocarbons desired are isolated as by distillation or gas chromatography.

High boiling compounds formed in the electrolysis are collected through the drain cock incorporated at the bottom of the electrolytic cell. The mixture drawn from the bottom is washed with aqueous solution of alkali to remove a small amount of hydrogen fluoride remaining therein, then dried and finally subjected to distillation or gas chromatography to obtain the products aimed at.

The products of this invention have been identified through analysis for infrared absorption spectrum and mass spectrum.

The raw materials such as anhydrous hydrogen fluoride, trihalogenated methylbenzonitriles or derivatives thereof which are used for the method of this invention are easy of handling and manufacture and inexpensive. Further, the method of this invention can be practiced by a very simple apparatus. Consumption of electricity and fluorine is small. Thus, the method of this invention proves to be advantageous from the standpoint of commercial application.

The following examples are further illustrative of this invention. It should be understood that the invention is not limited thereto.

EXAMPLE 1:

A cylindrical electrolytic cell made of Monel Metal was used. Inside this cell were alternately disposed nine nickel anodes and ten nickel cathodes each having an effective surface area of 20 $dm^2$. The top of the cell extended through a copper-made reflux condenser cooled with $-15°C$ brine to a sodium fluoride pipe, washing bottles and traps. To this electrolytic cell, 1.28 liters of anhydrous hydrogen fluoride was introduced to effect preliminary electrolysis for cleaning the cell interior of foreign matter. Then, 10g of sodium fluoride was added as an electroconductive agent, followed by introduction of an initial portion of meta-trifluoromethyl benzonitrile into the cell. The contents of the cell were subjected to electrolysis, with the anodic current density fixed at 1.1 – 1.6 $A/dm^2$, the cell voltage at 5.3 – 7.2 V and the bath temperature at 5° – 7°C. A second portion of metha-trifluoromethyl benzonitrile sufficient to bring the total of the two portions to 32.2g (0.188 mol) was further added during the course of electrolysis. Through the bottom of the electrolytic cell, helium was blown in continuously at a rate of 150 ml/min. Within the cell, electrolysis of hydrogen fluoride, fluorination of metatrifluoromethyl benzonitrile and other reactions occurred with evolution of a gas. The gas evolving from the cell passed through the sodium fluoride tube and the washing bottles and reached the traps cooled with ice and liquefied nitrogen, with the evolving hydrogen released into the atmosphere. The amount of electricity used for the electrolysis was 150 A.hr. For 1.5 hours after the completion of the electrolysis, said forced introduction of helium was continued for the purpose of removing low boiling products from within the electrolytic cell and also causing the products stagnating in the sodium fluoride tube to be driven into the cooled trap. In the cooled traps, a total of 27.8g of fluorocarbons was obtained. By subjecting these fluorocarbons to trap-to-trap distillation and gas chromatography, there were obtained 15.4g of 1,3-bis-(trifluoromethyl)-decafluorocyclohexane and 3.5g of trifluoroundecafluorocyclohexane. The yield of these perfluorocyclohexane derivatives was found to be 25.8 percent based on the raw material.

The other fluorocarbons which were n-tetradecafluorohexane, n-dodecafluoropentane, octafluoropropane, hexafluoroethane, tetrafluoromethane and trifluoromethane were obtained in a combined weight of 9.2g inclusive of nitrogen trifluoride.

EXAMPLE 2:

By following substantially the same procedure as used in Example 1, 34.9g (0.204 mol) of ortho-trifluoromethyl benzonitrile was subjected to electrolytic fluorination, with 10g of sodium fluoride added to the cell interior. The conditions under which the electrolysis was carried out were 1.1 – 1.6 $A/dm^2$ of anodic current density, 5.3 – 7.3 V of cell voltage and 5° – 10°C of bath temperature. Helium was introducedinto the cell at a rate of 150 ml/min. The amount of electricity used for the electrolysis was 150 A.hr. In the cooled traps, a total of 10.8g of fluorocarbons was obtained. By subjecting these fluorocarbons to trap-to-trap distillation and gas chromatography, there were obtained 7.9g of 1,2-bis-(trifluoromethyl)-decafluorocyclohexane and 0.8g of trifluoroundecafluorocyclohexane. The yield of these perfluorocyclohexane derivative was found to be 10.8% based on the raw material.

The other products including n-tetradecafluorohexane, n-dodecafluoropentane, octafluoropropane, hexafluoroethane, tetrafluoromethane, trifluoromethane and nitrogen trifluoride were obtained in a combined weight of 2.1g.

What is claimed is:

1. A method for the manufacture of perfluoroalicyclic hydrocarbon composed of perfluorocyclohexane derivative having trifluoromethyl groups substituted for fluorine atoms of perfluorocyclohexane and represented by the formula:

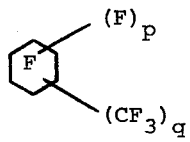

wherein $q$ is an integer of 2 to 6 and p is an integer equaling the substraction of 12-q by electrolyzing a solution containing sodium fluoride electroconductive agent and having dissolved in anhydrous hydrogen fluoride, a corresponding aromatic hydrocarbon composed of benzene derivative of the formula:

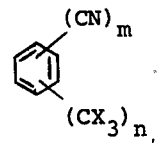

wherein $m$ is an integer of 1 to 5, $n$ is an integer of 1 to 5, the sum of $m + n$ equals $q$ and X represents fluorine atom, said electrolyzing being carried out using nickel electrodes, a bath temperature fixed between $-10°C$. and $+20°C$., a voltage between 4 and 9V, an anodic current density between 0.5 and 3.0 A/dm$^2$, and blowing an inert gas into the electrolytic bath during electrolysis.

2. A method according to claim 1, wherein the aromatic hydrocarbon composed of a benzene derivative is one member selected from the group consisting of trifluoromethyl benzonitrile and bis-(trifluoromethyl)-benzonitrile.

* * * * *